US008704152B2

(12) United States Patent
Svajda et al.

(10) Patent No.: US 8,704,152 B2
(45) Date of Patent: Apr. 22, 2014

(54) APPARATUS AND CIRCUIT WITH A MULTI-DIRECTIONAL ARRANGEMENT OF OPTICAL ELEMENTS

(75) Inventors: Miroslav Svajda, San Jose, CA (US); Wayne T. Holcombe, Mountain View, CA (US)

(73) Assignee: Silicon Laboratories Inc., Austin, TX (US)

(*) Notice: Subject to any disclaimer, the term of this patent is extended or adjusted under 35 U.S.C. 154(b) by 439 days.

(21) Appl. No.: 12/975,328

(22) Filed: Dec. 21, 2010

(65) Prior Publication Data

US 2011/0248152 A1 Oct. 13, 2011

Related U.S. Application Data

(60) Provisional application No. 61/323,798, filed on Apr. 13, 2010.

(51) Int. Cl.
*G06M 7/00* (2006.01)

(52) U.S. Cl.
USPC ........................................... 250/221

(58) Field of Classification Search
USPC ............... 250/221, 216, 203.4, 206.1, 206.2; 1/221, 216, 203.4, 206.1, 206.2
See application file for complete search history.

(56) References Cited

U.S. PATENT DOCUMENTS

| 4,633,317 | A | | 12/1986 | Uwira et al. | |
|---|---|---|---|---|---|
| 5,393,970 | A | * | 2/1995 | Shau et al. | 250/206.2 |
| 5,726,443 | A | * | 3/1998 | Immega et al. | 250/227.2 |
| 2007/0273658 | A1 | * | 11/2007 | Yli-Nokari et al. | 345/173 |

OTHER PUBLICATIONS

Butler, Alex; Izadi, Shahram; and Hodges, Steve, "SideSight: Multi-"touch" interaction around small devices," Microsoft Research, Cambridge, UK, UIST '08 Proceedings of the 21st Annual ACM Symposium on User Interface Software and Technology, 2008, pp. 1-4.
HSDL-9100 Surface-Mount Proximity Sensor, Avago Technologies, AV02-2259EN, Nov. 26, 2009, pp. 1-13.

* cited by examiner

*Primary Examiner* — Thanh Luu
(74) *Attorney, Agent, or Firm* — Cesari & Reed LLP; R. Michael Reed

(57) ABSTRACT

An apparatus includes a housing having a front surface, a rear surface, and at least one sidewall therebetween and a plurality of optical windows formed in the housing to allow light to pass through from multiple directions. The apparatus further includes a plurality of photo detectors to generate electrical signals based on received light, where each of the plurality of photo detectors is disposed within a respective one of the plurality of optical windows. The apparatus also includes a control circuit coupled to the plurality of photo detectors to receive the electrical signals, determine light variations from the electrical signals, and determine a change in position of an object based on variation ratios of the light variations received by at least one pair of photo detectors within the plurality of photo detectors in response to determining the light variations.

18 Claims, 8 Drawing Sheets

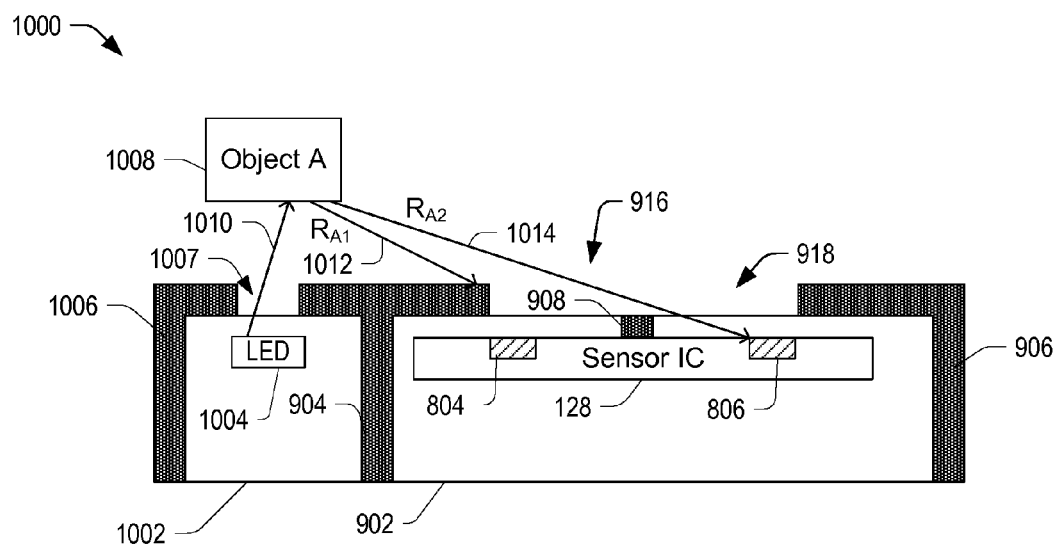
FIG. 10
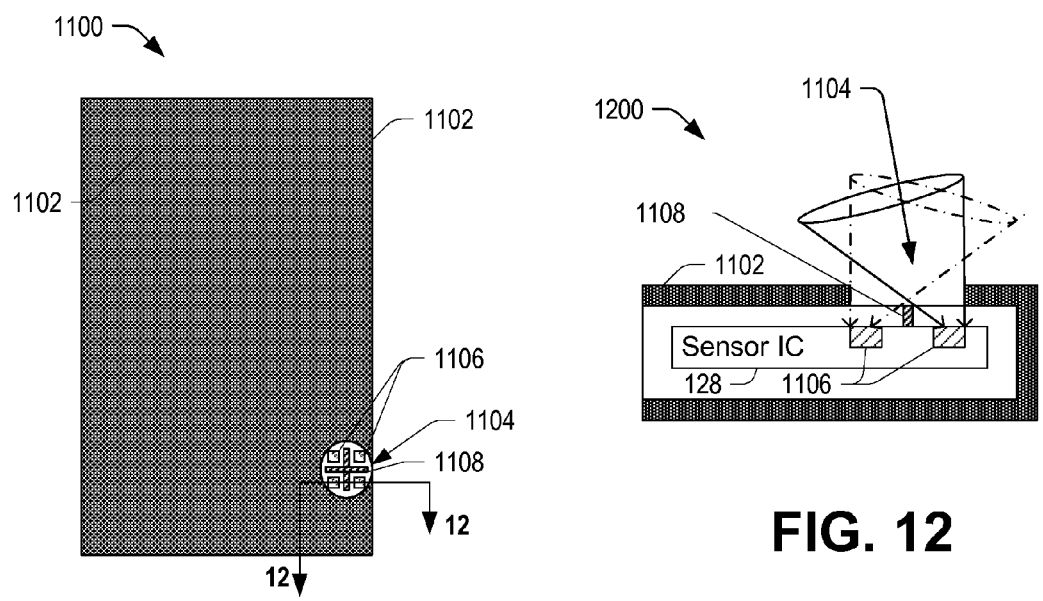
FIG. 11
FIG. 12

APPARATUS AND CIRCUIT WITH A MULTI-DIRECTIONAL ARRANGEMENT OF OPTICAL ELEMENTS

CROSS REFERENCE TO RELATED APPLICATION(S)

This application claims priority from and is a non-provisional patent application of U.S. Provisional Patent Application No. 61/323,798 filed on Apr. 13, 2010 and entitled "APPARATUS WITH OPTICAL FUNCTIONALITY AND ASSOCIATED METHODS," which is incorporated herein by reference in its entirety.

FIELD

The present disclosure is generally related to optical proximity detectors, and more particularly to an electronic device with a multi-directional arrangement of optical elements.

BACKGROUND

Small, portable electronic devices often use touch-sensitive screens for receiving user inputs. Products available from various companies frequently include such touch-sensitive screens. Use of such screens for user input allows for larger display sizes while reducing the space reserved for user input. Some of these products also extend the touch-screen sensing capabilities to support multi-touch gestures.

SUMMARY

In an embodiment, an apparatus includes a housing having a front surface, a rear surface, and at least one sidewall therebetween and a plurality of optical windows formed in the housing to allow light to pass through from multiple directions. The apparatus further includes a plurality of photo detectors to generate electrical signals based on received light, where each of the plurality of photo detectors is disposed within a respective one of the plurality of optical windows. The apparatus also includes a control circuit coupled to the plurality of photo detectors to receive the electrical signals, determine light variations from the electrical signals, and determine a change in position of an object based on variation ratios of the light variations received by at least one pair of photo detectors within the plurality of photo detectors in response to determining the light variations.

In another embodiment, a circuit includes a substrate including at least one sidewall and a plurality of photodiodes configured to generate electrical signals based on received light including light variations caused by an object moving proximate relative to the substrate. At least some of the plurality of photodiodes are positioned along the at least one sidewall of the substrate and configured to receive light from at least two angles. The circuit further includes a plurality of optical barriers, where at least one of the plurality of optical barriers disposed between adjacent ones of the plurality of photodiodes. The circuit also includes a control circuit coupled to the plurality of photodiodes to receive the electrical signals, determine the light variations from the electrical signals, and determine a change in position of the object based on variation ratios of the light variations received by at least one pairs of photodiodes of the plurality of photodiodes in response to determining the light variations.

In still another embodiment, an apparatus includes a housing including a front wall, a rear wall and at least one sidewall extending therebetween and includes a plurality of optical elements. The apparatus further includes a plurality of optical windows formed along the at least one sidewall, where each optical window allows light to pass through from at least two directions relative to the housing. Each of the plurality of optical windows includes at least one of the plurality of optical elements. The apparatus further includes a control circuit within the housing and coupled to the plurality of optical elements. The control circuit is configured to determine light variations using at least some of the plurality of optical elements and determine a change in position of an object based on variation ratios of the light variations received by at least one pair of optical elements of the plurality of optical elements in response to determining the light variations.

BRIEF DESCRIPTION OF THE DRAWINGS

FIG. 10 is a cross-sectional view of a portion of a third embodiment of a system including multiple photo detectors having multiple view angles including limited view angles through apertures in an opaque cover layer.

FIG. 11 is a top view of an embodiment of an apparatus including an opaque cover layer having an aperture above a sensor integrated circuit including multiple photo detectors separated by optical barriers.

FIG. 12 is a cross-sectional view of the apparatus of FIG. 11 taken along line 12-12 in FIG. 11.

In the following description, the use of the same reference numerals in different drawings indicates similar or identical items.

DETAILED DESCRIPTION OF ILLUSTRATIVE EMBODIMENTS

Figure 1:
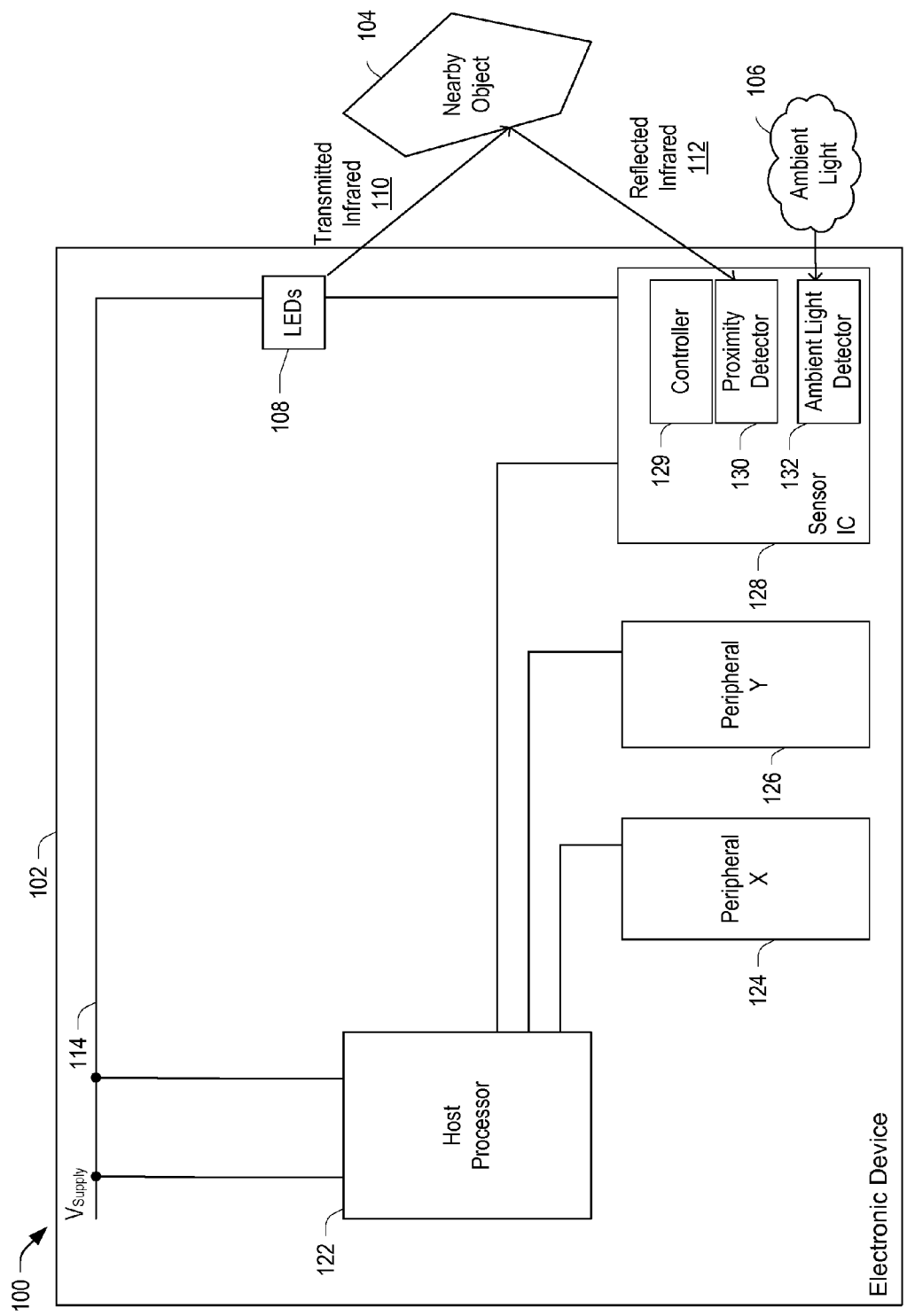
FIG. 1 is a partial block diagram and partial schematic diagram of an embodiment of a system including a circuit configured to communicate with a multi-directional arrangement of optical elements.

Embodiments of an apparatus, a circuit, and methods are disclosed below that provide directional control inputs for a device, such as a hand-held, mobile, or other relatively small device, by distributing proximity sensors and/or light-emitting diodes (LEDs) at or near the device's sidewalls and by controlling the aperture of the photo detectors. In particular, optical elements are distributed within optical windows disposed at or near sidewalls of the device, where each optical window allows light to pass through the optical window from or toward at least two sides of the device (e.g., along the side and the front, along a first side and a second side, along first and second sides and along a portion of the front, and so on). Each optical window includes an LED or at least one proximity sensor or photodiode. Reflective elements can be positioned next to the optical elements (LEDs and/or proximity sensors) to further enhance the view angles, i.e., the angles at which light emitted by an LED is allowed to pass through the housing and/or the angles by which reflected light can be received by a proximity sensor (or photodiode) within the optical window. As used herein, the term "view angle" refers to one or more angles by which light can pass through the opaque cover layer. By providing optical view angles extending on two or more sides (i.e., by allowing light to pass through the opaque cover from two or more directions, proximity and/or motion of objects (for example, objects that are relatively close to the device) can be detected along the sides and sidewalls of the device and, in some instances, extending to an area above the substrate.

In a particular example, an optical element (LED or proximity sensor) can be placed at a side/corner location of a mobile phone (or device, generally) to form an optical window having a view angle that is greater than, for example, ninety degrees (i.e., allowing light to pass through the cover multiple directions spanning an angle of more than 90 degrees), so that the view angle of the optical element covers a portion of a top surface and portions of the sides relative to the housing. By placing optical elements about the sidewalls of the device, gesture control inputs can be moved from above the relatively small screen of the device to its sidewalls, improving the graphical user-interface feedback by moving one source of access blocking and shadowing of the display to the sidewalls. In one embodiment, the proximity sensor is placed in the middle of each long sidewall of the phone or device (e.g., along the sidewall of the screen), and LEDs are placed in each corner. The optical windows provide expanded view angles to allow the LEDs and the proximity sensors to optically detect proximity and/or motion (horizontally and/or vertically) adjacent to the sidewall of the phone or device.

An integrated circuit coupled to the LEDs and the proximity sensors can be used to detect light variations between pairs of proximity sensors. In an example, proximity sensors generate electrical signals proportional to received light. The integrated circuit determines a proximity of an object based on reflectances received by the proximity sensors. In particular, a ratio of reflectances received by any two proximity sensors indicates a relative position of the object with respect to the sensor. Changes in such ratios reflect motion of the object relative to the proximity sensors. The view angles described above permit detection of proximity and motion relative to an object along the sides of the device, making it possible to receive user inputs based on motion along the sides of the device that does not obstruct the display.

In another exemplary embodiment, an arrangement to enhance the sensor viewing angle includes reflectors or reflective elements positioned around the LEDs and/or the proximity sensors, such that the reflectors direct the light from the LED toward the object/proximity detector area, and vice versa. The reflectors can expand the view angle (i.e., can expand the number of angles or directions in which the light from the LEd can be reflected) to take advantage of the available light output and/or light detection capabilities of the LED and the proximity sensor, respectively, to provide expanded optical areas for proximity and motion detection.

In the following discussion of the illustrated embodiments, various elements are depicted as being connected to one another. However, it should be understood that the various embodiments may include additional circuit elements (not shown) through which such connections are made. Accordingly, in the following discussion, the term "coupled" includes, but is broader than, a direct connection.

FIG. 1 is a partial block diagram and partial schematic diagram of one possible embodiment of a system 100 including an electronic device 102 configured to communicate with a multi-directional arrangement of optical elements, including LEDs 108, proximity detector 130, and ambient light detector 132. Electronic device 102 is configured to transmit infrared light 110 toward an object 104 and to detect reflected light 112 and ambient light 106.

Electronic device 102 includes a voltage supply ($V_{Supply}$) terminal 114 coupled to a first terminal of LEDs 108, which have a second terminal coupled to a sensor integrated circuit (IC) 128. Electronic device 102 further includes a host processor 122 coupled to the voltage supply ($V_{Supply}$) terminal 114, to peripheral circuits 124 and 126, and to sensor IC 128. In an example, host processor 122 is coupled to the voltage supply ($V_{Supply}$) terminal 114 by voltage regulators (not shown).

Sensor IC 128 includes a controller 129 configured to coordinate operations of various blocks of sensor IC 128. Sensor IC 128 further includes a proximity detector 130 to receive reflected infrared light 112 and to detect a proximity of the object 104 based on light variations in the reflected light. In particular, proximity detector 130 detects a proximity of object 104 based on ratios of light variations between any two photo detectors. Further, proximity detector 130 can determine motion of object 104 based on changes in the variation ratios of the light variations between pairs of photo detectors over time. Ambient light detector 132 detects ambient light 106 when the LEDs 108 are turned off. Sensor IC 128 can control LEDs 108 to turn them off and sample the photo detectors. In some instances, the same photo detectors can be used for ambient light detection by turning off LEDs 108 and measuring the light.

In an embodiment, controller 129 deactivates LEDs 108 and uses ambient light detector 132 to measure ambient light conditions for calibration of the photo detectors. Once calibrated, controller 129 activates at least one of the LEDs 108 and uses proximity detector 130 to measure the reflected light. Proximity detector 130 includes multiple photo detectors (such as photodiodes or other light sensitive devices). Proximity detector 130 generates electrical signals proportional to the received light. Sequential measurements from one or more pairs photo detectors can be used to determine ratios of reflectances, which indicate a relative position of object 104. In a multi-LED implementation, each LED may be selectively activated by controller 129, and sensor IC 128 measures the resulting photo detector current when each LED is activated. Sensor IC 128 communicates the electrical signals to host processor 122. Over time, movement of the object produces changes in the electrical signals, which are also communicated to host processor 122. Sensor IC 128 includes an analog-to-digital converter, allowing sensor IC 128 to provide host processor 122 with digital measurements of light energy as sensed by on-chip photodiodes through a transparent IC package. In a particular embodiment, relatively high sensitivity is achieved through direct coupling of photodiodes (photo detectors) to a delta-sigma analog-to-digital converter, having relatively high resolution, via a multiplexer (not shown), and using per-measurement calibration, as desired.

Host processor 122 is configured to determine proximity of object 104 based on ratios of the digital measurements from a pair of photo detectors at a given time interval. Host processor 122 determines motion of object 104 based on changes in the ratios over time, which represent relative motion of object 104 (i.e., vector motion). Host processor 122 can interpret the relative motion of object 104 as gestures. For example, positive motion in one axis (such as a horizontal axis in the plane of the device) can be interpreted as a "right scroll" operation and negative motion in the same axis can be interpreted as a "left scroll" operation, which can be reflected by a user interface presented on the display by shifting the visible portion of the user interface in the scroll direction (i.e., left or right). Motion within a second axis (such as a vertical axis in the plane of the device) can be interpreted as "up scroll" or "down scroll" operations, which can be reflected by shifting the visible portion of the user interface up or down within the display. Motion within a third axis (such as a vertical axis perpendicular to the plane of the device) can be interpreted as "click" operation, which can be reflected by selection of a user selectable option within the user interface. A sequence of two movements within the third axis can be interpreted as a "double click" operation, which can select or activate an element or function depicted within the user interface.

Sensor IC 128 receives commands from host processor 122. Controller 129 of sensor IC 128 configures an analog-to-digital converter (ADC) multiplexer (not shown) associated with proximity detector 130 and ambient light detector 132, controls the ADC multiplexer, receives data from proximity detector 130 and/or ambient light detector 132, and controls transmission of the data to host processor 122. Depending on the implementation, controller 129 may be a dedicated digital controller or a programmable microprocessor-based controller.

In an embodiment, sensor IC 128 performs optical reflectance proximity, motion, and ambient light functions with high sensitivity and reduced power consumption relative to conventional circuitry. Electronic device operates with relatively low power consumption by controlling LED drivers, analog-to-digital converter, and associated circuitry using a relatively low duty cycle. In some embodiments, host processor 122 and sensor IC 128 (including all or some of the blocks of circuitry depicted in FIG. 1) and other circuitry described herein, such as photo detectors (e.g., photodiodes), may be integrated within a single semiconductor die or may be integrated within one IC or device, as desired. Integration of host processor 122 and sensor IC 128 (whether on a single die, within a multi-chip module, etc.) may provide advantages in some applications. Such advantages can include enhanced speed, reduced costs, etc.

Further, other system functions include control and monitoring functions and digital-to-analog conversion. Additional sensors, controllers, actuators, multiplexers, and other circuits (such as analog-to-digital converters, filters, amplifiers, etc.) may be part of sensor IC 128 and/or may be directly controlled by sensor IC to enhance system functionality. Further, the embodiment of electronic device 102 in FIG. 1 is one of many possible embodiments of a device and/or circuit configurable to control LEDs 108 and to measure reflected light from an object 104.

Figure 2:
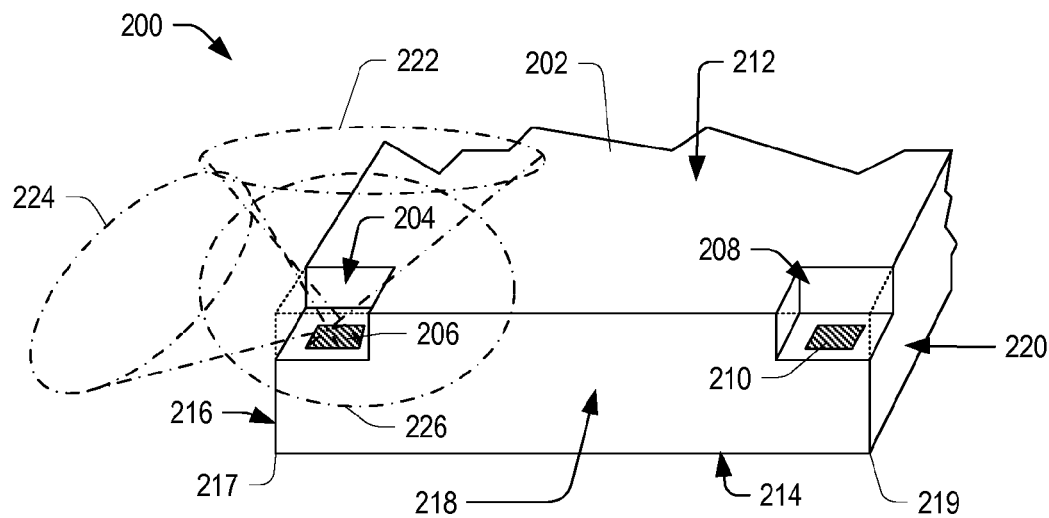
FIG. 2 is a perspective view of a portion of an embodiment of an apparatus including optical elements disposed within optical windows configured to provide multi-directional view angles.

FIG. 2 is a perspective view of a portion of an embodiment of an apparatus 200 including optical elements disposed within optical windows configured to provide multi-directional view angles. Apparatus 200 can be a cell phone, a hand-held electronic device, or another small-profile electronic device configured for proximity and/or motion detection. Apparatus 200 includes a substrate 202, which may be a printed circuit board (PCB), semiconductor die or a multi-chip integrated circuit. Substrate 202 includes a top (front) surface 212, a bottom (rear) surface 214, and sides 216, 218, and 220. Substrate 202 includes a first corner 217 between sides 216 and 218 and a second corner 219 between sides 218 and 220.

Substrate 202 includes a first optical window 204 at first corner 217 of substrate 202 and a second optical window 208 at second corner 219 of substrate 202. Optical window 204 and 208 includes corresponding optical elements 206 and 210, respectively. Optical elements 206 and 210 can be photodiodes and/or LEDs, depending on the implementation.

Optical window 204 extends along side 216, side 218, and a portion of top surface 212. Similarly, optical window 208 extends along side 218, side 220, and a portion of top surface 212. Optical windows 204 and 208 provide a view angle that extends in three directions (i.e., optical windows 204 and 208 allow light to be received from three directions). For example, optical window 204 allows for a first view angle 222 associated with light directed toward a direction of top surface 212, a second view angle 224 associated with light directed toward a direction of side 216, and a third view angle 226 associated with light directed toward a direction of side 218. The extended view angles (i.e., the ability to emit light in multiple directions) take advantage of the 110-120 degree half-angle pattern supported by low-profile surface-mount LEDs, for example, to allow for illumination of objects along the sides and adjacent to sidewalls of substrate 202. Optical windows may be realized as notches in the light-opaque cover material or as an IR transparent overlay molded over the light opaque barriers, which form the optical windows, forming a seamless continuous surface.

In an embodiment, optical elements 206 and 210 are photodiodes coupled to sensor IC 128 and configured to generate electrical signals based on received light and to provide the electrical signals to sensor IC 128. Sensor IC 128 can perform passive proximity detection based ratios of light variations between one or more pairs of photodiodes as represented by the electrical signals, which may be proportional to the light received by the photodiodes. Sensor IC 128 can perform passive motion detection based on changes in direct or reflected ambient light represented by the electrical signals associated with motion of an object near sides 216, 218, or 220 and/or near top surface 212. In particular, motion of an object in a Z-direction or in an X or Y-direction near substrate 202 may produce changes in the electrical signals produced by optical elements 206 and 210, which changes can be interpreted by sensor IC 128 and/or by host processor 122 to detect a proximity and/or motion of an object based on changes in the ratios of light variations over time. As discussed above, host processor 122 is configured to interpret motion as user input, such as gestures and selections by a user.

Alternatively, optical elements 206 and 210 may be used to perform active proximity/motion detection by measuring light from a controlled light source (such as an LED) that is reflected by a object. An example of a portion of another apparatus including multiple optical windows including LEDs is described below with respect to FIG. 3.

Figure 3:
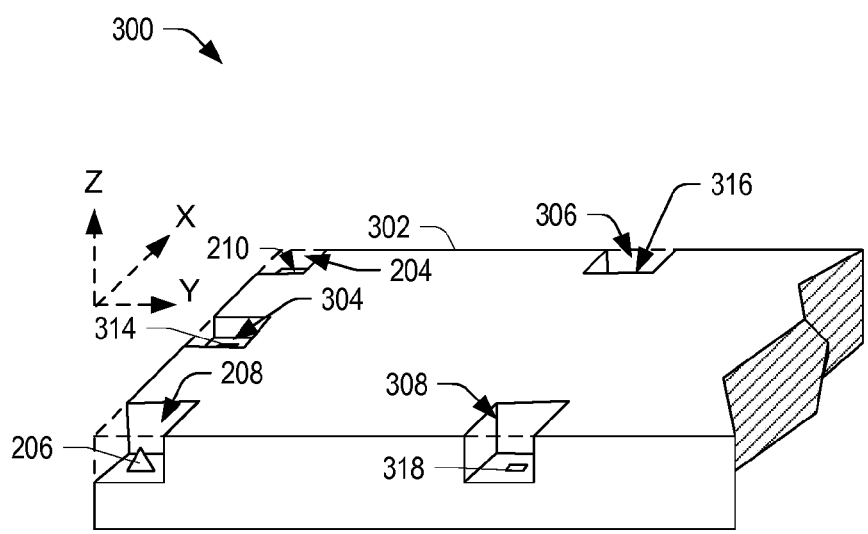
FIG. 3 is a perspective view of a second portion of an embodiment of an apparatus including optical elements disposed within optical windows configured to provide multi-directional view angles.

FIG. 3 is a perspective view of a portion of a second embodiment of an apparatus 300 including optical elements disposed within optical windows configured to provide multi-directional view angles (allowing light to pass through a cover layer via multiple angles (directions)). Apparatus 300 includes a substrate 302 including optical windows 204 and 208 with optical elements 206 and 210, respectively, which are implemented as LEDs. Substrate 302 further includes optical windows 304, 306, and 308 including photodiodes 314, 316, and 318, respectively. Optical elements 206 and 210 and photodiodes 314, 316, and 318 are coupled to sensor IC 128, which controls their operation.

In an example, sensor IC 128 selectively activates at least one of optical elements 206 and 210 to emit light and samples an electrical signal from at least one of photodiode 314, 316, and 318 to sense reflected light. Sensor IC 128 may sequentially drive optical elements 206 and 210 (and other LEDs) to briefly illuminate areas using infrared light and sequentially sample the various photodiodes (including photodiodes 314, 316, and 318) to measure reflected light from objects. Over time, sensor IC 128 detects proximity of an object based on ratios of reflectances between any two photodiodes, such as photodiodes 314 and 316 or between photodiodes 314 and 318 in this example. In particular, photodiode 314 receives a first reflectance and photodiode 316 receives a second reflectance. A ratio of the first reflectance and the second reflectance can be interpreted to detect a proximity of a object relative to photodiodes 314 and 316. Over time, changes in the ratios can be interpreted to determine vector motion of the object relative to photodiodes 314 and 316.

In a particular example, a blanking interval may be provided between each measurement to allow sensor IC 128 to calibrate a selected photodiode (such as one of photodiodes 314, 316, or 318) for ambient conditions before measuring the reflected light, which superimposed over the ambient light. During such a blanking interval, optical elements 206 and 210 are inactive, and the selected photodiode is sampled to detect an electrical signal proportional to ambient light conditions. For multiple photodiodes used in ambient light motion detection, to have the same ambient light the measurements are taken quite rapidly. In a particular example, the clock signal is approximately 20 MHz, and consecutive measurements are taken approximately 25.6 μs apart. For active motion detection using LEDs, sequentially-driven LEDs can be focused or directed in different directions to create substantially non-overlapping radiation patterns. In this instance, sensor IC 128 can evaluate motion based on time and reflectance differences while sampling photo detectors (synchronously or asynchronously) with each LED drive signal.

In the illustrated example, a single photodiode 314, 316, and 318 is provided on each side of substrate 302. In other embodiments, multiple photodiodes may be provided on each side of substrate 302 and separated by optical barriers configured to at least partially block reflected light to provide spatial dependence between any two photodiodes.

Each of the optical windows 204, 208, 304, 306, and 308 provides a view angle that allows light to pass through toward or from at least one of the sides of substrate 302 and toward or from at least a portion of a top surface of substrate 302. While substrate 302 includes LEDs at the corners and photodiodes along the sides, it should be appreciated that, in other implementations, LEDs may be located along the middle and photodiodes may be provided at the corners. Further, in various embodiments, other photodiodes and LEDs may be provided along the top surface. An example of a view angle for optical window 204 is described below with respect to FIG. 4.

Figure 4:
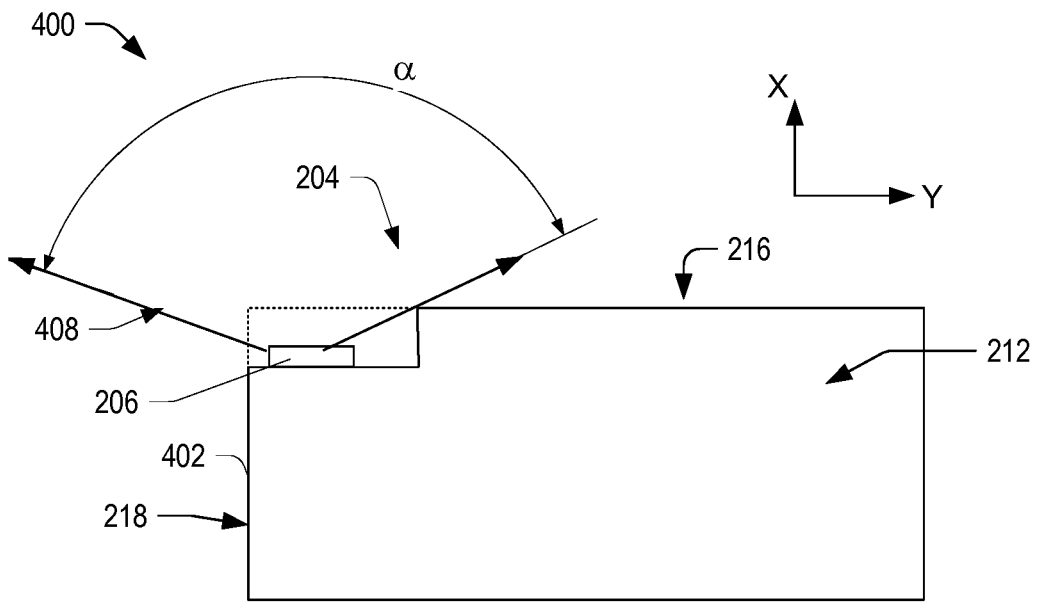
FIG. 4 is block diagram of an embodiment of an apparatus including an optical element disposed within an optical window configured to provide multi-directional view angles.

FIG. 4 is block diagram of an embodiment of an apparatus 400 including an optical element disposed within an optical window configured to provide multi-directional view angles. Apparatus 400 includes a substrate 402 including optical window 204 and optical element 206. Optical window 204 extends along sides 216 and 218, providing a view angle ($\alpha$) 408, which is greater than ninety degrees. View angle ($\alpha$) refers to a range of angles at which light can pass through the optical window. In an embodiment, optical element 206 is a low-profile surface-mount LED having a relatively wide half-angle pattern of approximately 110 to 120 degrees. By positioning the optical window 204 in a corner of substrate 402, a view angle is provided that can be greater than 110 to 120 degrees, making use of a full range of the LED for illuminating objects. In an example, the view angle can be further enhanced if the corner of the window is rounded and/or a lens is placed above the optical element 206. Further, though not shown in this embodiment, LED may illuminate an area adjacent to a top surface 212 of substrate 402, allowing for illumination of objects along the sides 216 and 218 and near top surface 212.

In the illustrated example, assuming a low-profile surface-mount LED having a relatively wide half-angle pattern of approximately 110 to 120 degrees, optical window 204 provides a view angle of approximately sixty degrees toward sides 216 and 218 and at least sixty degrees toward the top surface 212. Further, reflectors can be used to extend the view angles for at least some of the optical windows. An example of a substrate including optical windows having at least one optical window that includes reflectors is described below with respect to FIG. 5.

Figure 5:
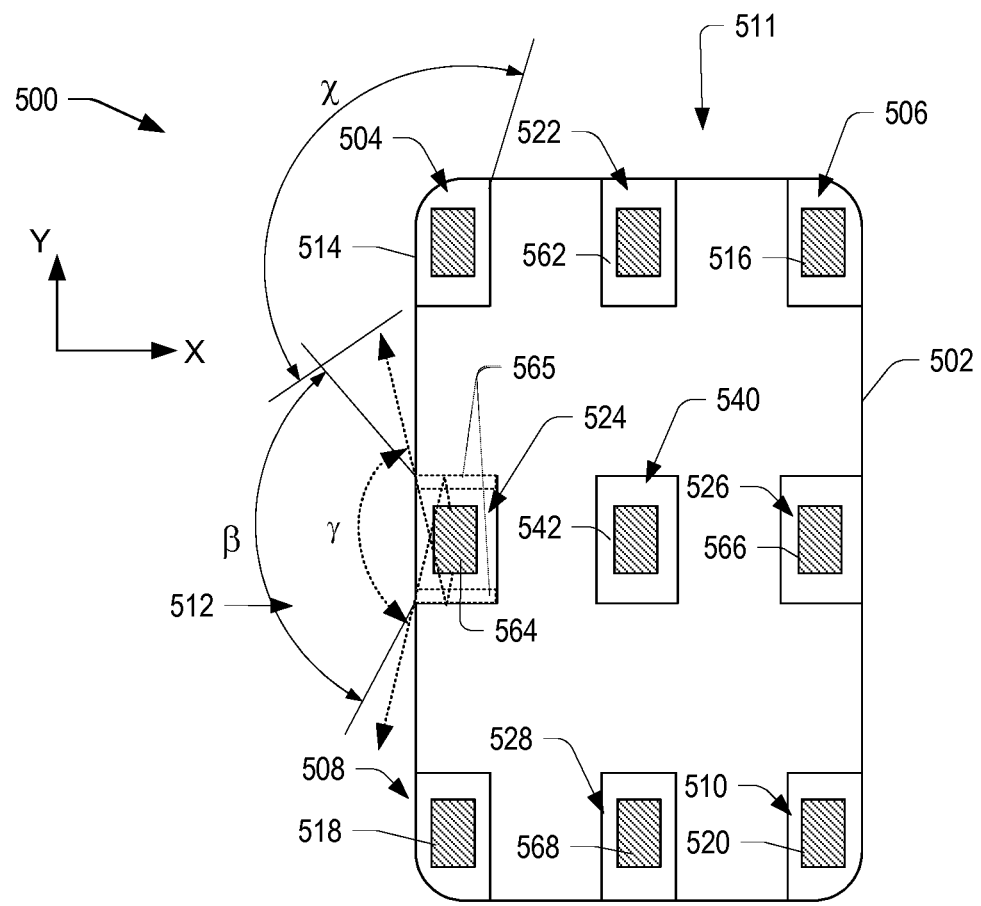
FIG. 5 is a block diagram of an embodiment of an apparatus, depicted from a top view angle, having a plurality of optical elements disposed within optical windows, where at least some of the optical windows provide multi-directional view angles.

FIG. 5 is a block diagram of an embodiment of an apparatus 500, depicted from a top view angle, having a plurality of optical elements disposed within optical windows, where at least some of the optical windows provide multi-directional view angles. Apparatus 500 includes substrate 502 including optical windows 504, 506, 508, and 510 positioned at corners and optical windows 522, 524, 526 and 528 positioned at midpoints along the sides. Substrate 502 further includes an optical window 540 at a center of substrate 502. Each optical window 504, 506, 508, 510, 522, 524, 526, 528 and 540 includes a corresponding optical element 514, 516, 518, 520, 562, 564, 566, 568, and 542, respectively.

Optical window 504 provides a view angle ($\chi$), which allows for light to be received from two angles, i.e., from sides 511 and 512. View angle ($\chi$) can allow light to pass through across a range of angles relative to the substrate, where the range is greater than ninety degrees within the plane of substrate 502. Further, optical window 524 allows light to pass through from a range of directions that defines a second view angle ($\beta$) that that is smaller than the view angle ($\chi$) provided by optical window 504 and that extends adjacent to side 512. However, reflectors 565 may be provided within optical window 524 to extend the view angle provided by optical window 524, within the plane of substrate 502, as indicated by view angle ($\gamma$). In particular, reflectors 565 reflect light at one or more angles, extending a range of angles or directions to or from which the light may be transmitted or received. Reflectors 565 may be configured to provide a desired view angle.

In a particular embodiment, optical elements 514, 516, 518, and 520 can be LEDs and optical elements 562, 564, 566, and 568 can be photodiodes (or other types of proximity sensors). In an alternative embodiment, optical elements 514, 516, 518, and 520 can be photodiodes and optical elements 562, 564, 566, and 568 can be LEDs. By placing proximity sensors on side/corner locations of substrate 502, which can (for example) be incorporated within a cell phone or other small profile electronic device, optical window 504, for example, can provide a view angle of greater than ninety degrees (i.e., allowing light to pass through from multiple directions defining a directionality of over ninety degrees) so that the sensor and/or LED view angles cover perpendicular (top) and vertical (side) directions relative to substrate 502.

Compact cell phones or mobile devices that utilize small screens can benefit from the above-arrangement because the side-angles make it possible to sense gesture and motion-based inputs along the sides of the substrate 502 without limiting any visual GUI feedback due to access blocking and shadowing of the display. If the proximity sensor is placed within optical windows 524 and 526 and LEDs are placed in each corner within optical windows 504, 506, 508, and 510, the effective viewing angles can also cover the sides of the phone.

By placing a reflector around LEDs, proximity sensors, or both, the view angles can be enhanced. In the illustrated example, the reflectors 565 are depicted around optical element 564 to direct light from the object toward the proximity detector or vice versa. Optical element 564 may also be tilted toward the side 512 at an angle to enhance light reception. In an example, optical element 564 can be formed or coupled to substrate 502 at a tilt angle between zero degrees and ninety degrees relative to a planar surface of the substrate 502. In another example, the tilt angle may be zero degrees with respect to the X-Y plane of substrate, but the optical element may be rotated by an angle to take advantage (for example) of the corner optical window, such as optical window 504. In another example, a cover layer may be tilted or otherwise adjusted to focus light toward or from an optical element. Another arrangement is described below with respect to FIG. 6, which depicts an LED with a reflector to direct light from the LED toward an object.

Figure 6:
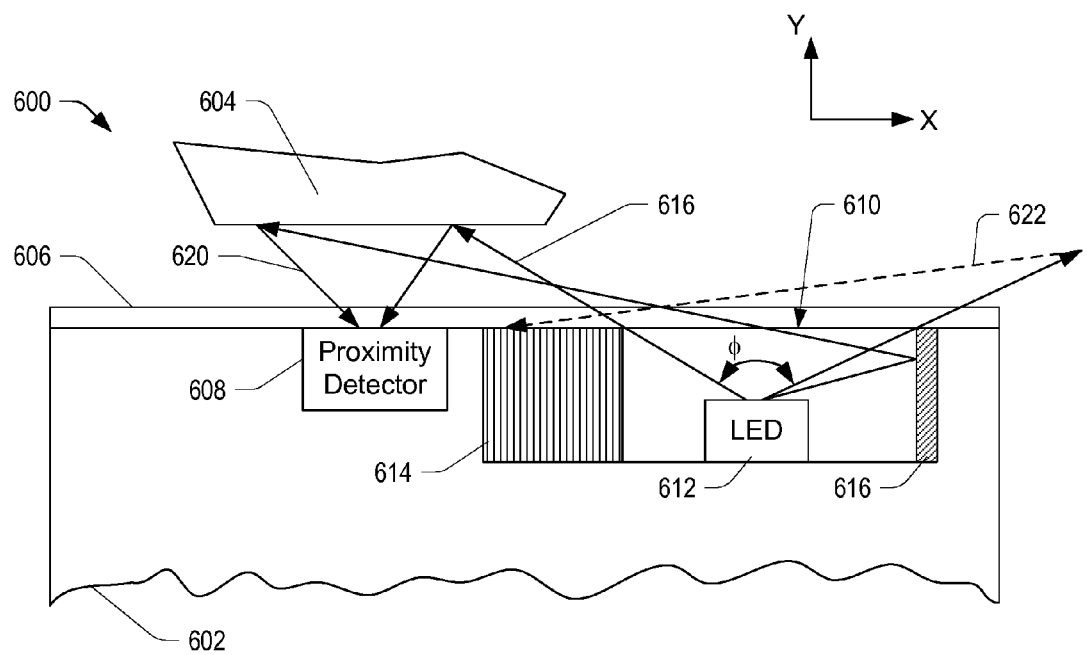
FIG. 6 is a block diagram of an embodiment of a system including a portion of an embodiment of an apparatus having a light-emitting diode positioned near a reflecting element to provide an expanded optical window.

FIG. 6 is a block diagram of an embodiment of a system 600 including a portion of an embodiment of an substrate 602 having a light-emitting diode 612 positioned near a reflecting element 616 to provide an expanded optical window 610. Substrate 606 includes a transparent cover 606, proximity detector 608 and an optical barrier 614. Light emitted by LED 612, such as light 616 is reflected by object 604 (as indicated by reflected light 620) toward proximity detector 608, which includes at least one photodiode. Some of the light emitted by LED 612 is reflected toward object 604 by reflector 616. Further, some light from LED 612 may be reflected by another object (as indicated by dashed line 622), which reflected light may be at least partially blocked by optical barrier 614.

In this example, optical barrier 614 provides at least partial optical isolation between LED 612 and proximity detector 608 to reduce optical coupling between LED 612 and proximity detector 608. Further, optical barrier 614 may provide at least partial optical isolation between proximity detector 608 and other proximity detectors (not shown) to provide spatial dependence with respect to light received at each of the proximity detectors.

In some instances, positioning LEDs and photodiodes near one another and along sidewalls of a substrate, such as substrate 602, may present difficulties in terms of optical cross-coupling between adjacent photodiodes and between LEDs and adjacent photodiodes. In particular, the transparent cover may reflect some light from the LED to an adjacent photodiode within the housing. Accordingly, it may be desirable to include one or more optical barriers to provide at least partial optical isolation between adjacent photodiodes and between photodiodes and LEDs. One example of a substrate including multiple optical elements and optical barriers is described below with respect to FIG. 7.

Figure 7:
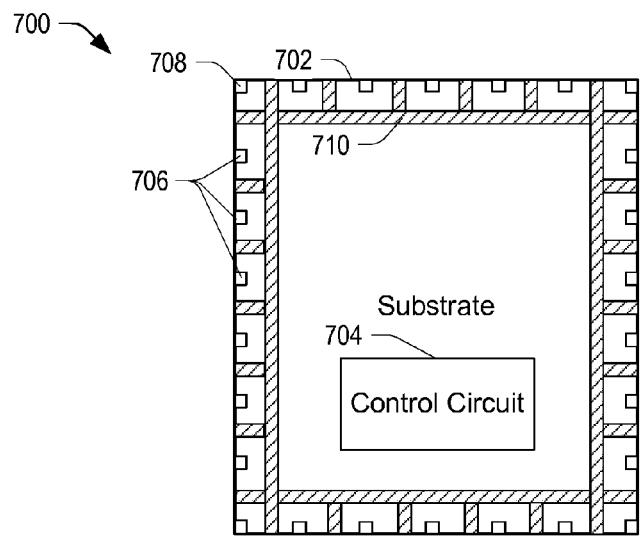
FIG. 7 is a block diagram of an embodiment of a circuit including multiple optical elements arranged along sidewalls of the circuit and including optical barriers configured to at least partially isolate the optical elements from one another.

FIG. 7 is a block diagram of an embodiment of a circuit 700 including multiple optical elements arranged along sidewalls of the circuit 700 and including optical barriers configured to at least partially isolate the optical elements from one another. Circuit 700 includes a substrate 702 having LEDs 708 at the corners and multiple photodiodes 706 along the sides. LEDs 708 and photodiodes 706 are separated from one another by optical barriers 710, which provide at least partial optical isolation between adjacent photodiodes 706 and between LEDs 708 and photodiodes 706. Substrate 702 further includes a control circuit 704, which is coupled to LEDs 708 and photodiodes 706 by wire traces (not shown).

In an example, control circuit 704 operates LEDs 708 and photodiodes 706 to detect proximity of an object adjacent to sides of substrate 702 through optical windows having expanded view angles, such as those described above with respect to FIGS. 2-6. Each of the photodiodes 706 generates an electrical signal proportional to light received, and control circuit 704 (such as sensor IC 128) determines ambient light and reflected light based on the electrical signals at different times (such as a first time when the LEDs 708 are off and a second time when LEDs 708 are on). Further, light variation ratios between any two photodiodes 706 can be interpreted by control circuit 704 to detect proximity of an object. Changes in the light variation ratios over time can be used to detect motion of the object.

While the above-described example of optical barriers 710 depicted barriers on at least two sides of each optical element (LEDs 708 and photodiodes 706), other arrangements of optical barriers are also possible. Further, portions of the housing may provide at least some portion of the optical barriers. In some embodiments, a transparent cover may be provided that allows light to pass through that also includes an optical barrier pattern that cooperates with optical barriers 710 to provide spatial dependence between the photodiodes 706. The optical barrier pattern within the transparent cover may be implemented using opaque paint or by forming opaque structures within the cover material. By positioning LEDs 708 at the corners and photodiodes 706 along the sidewalls, circuit 700 can be used within a sensor circuit (such as sensor IC 128 in FIG. 1) to detect proximity and/or motion of objects along sidewalls of a device that includes the circuit 700.

While the above examples described optical elements within a single optical window, it may be desirable to utilize apertures to focus the view angles in at least one direction. An example of an opaque cover layer with apertures located above the photo detectors to narrow the view angle of the photo detectors in a Z-direction is described below with respect to FIG. 8.

Figure 8:
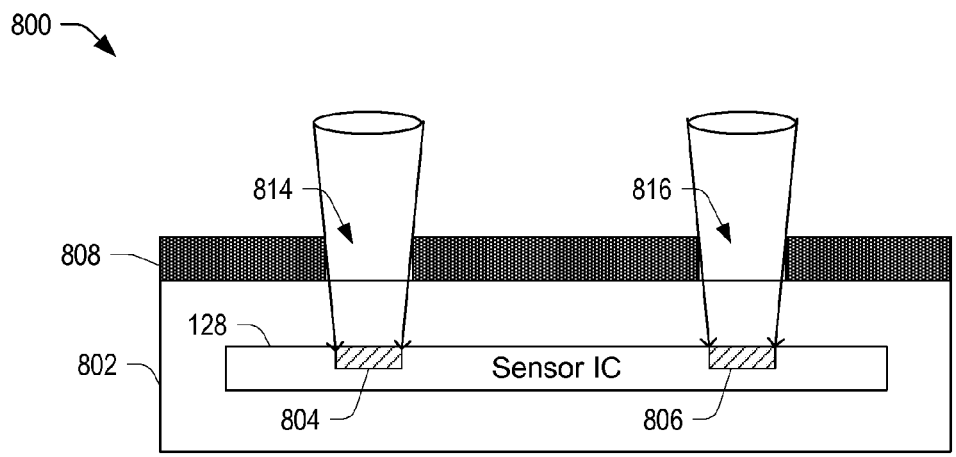
FIG. 8 is a cross-sectional view of a portion of an embodiment of a system including multiple photo detectors having multiple view angles including limited view angles through apertures in an opaque cover layer.

FIG. 8 is a cross-sectional view of a portion of an embodiment of a system 800 including multiple photo detectors and having multiple view angles including limited view angles through apertures in an opaque cover layer. System 800 includes a transparent substrate 802 with sensor IC 128 including photodiodes 804 and 806. System 800 further includes an opaque cover layer with apertures 814 and 816 above photodiodes 804 and 806, respectively. Apertures 814 and 816 can limit the field of view of photodiodes 804 and 806 to provide improved spatial dependence with respect to reflected light received at each of the photodiodes 804 and 806.

In some instance, rather than providing narrow apertures 814 and 816 over each of the photodiodes 804 and 806, which apertures 814 and 816 may be difficult to fabricate, it may be desirable to provide a larger aperture within the opaque cover layer 808 and use optical barriers formed on or above the surface of sensor IC 128 to enhance the spatial dependence of photo detectors 804 and 806. An example of such a configuration is described below with respect to FIG. 9.

Figure 9:
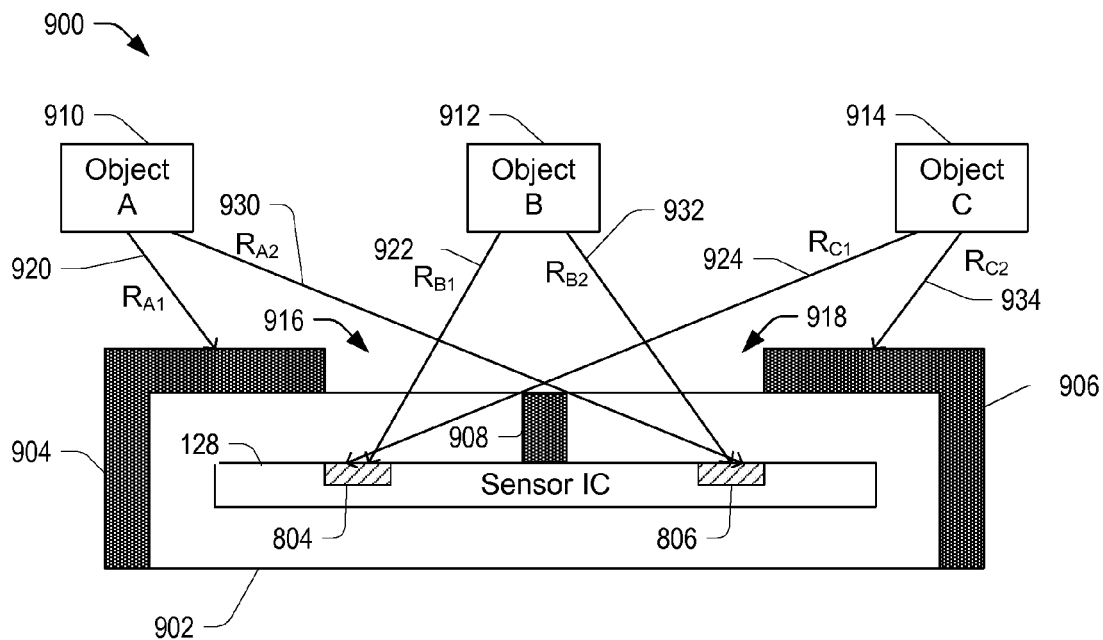
FIG. 9 is a cross-sectional view of a portion of a second embodiment of a system including multiple photo detectors having multiple view angles including limited view angles through apertures in an opaque cover layer.

FIG. 9 is a cross-sectional view of a portion of a second embodiment of a system 900 including multiple photo detectors having multiple view angles including limited view angles through an aperture in an opaque cover layer. System 900 includes a transparent substrate 902 with sensor IC 128 and photodiodes 804 and 806. Opaque cover layer portions 904 and 906 extend over the side sidewalls and over a portion of a top surface of substrate 902, leaving an aperture, which is divided into two optical windows 916 and 918 by optical barrier 908. Objects 910, 912, and 914 reflect light 920, 922, 924, 930, 932, and 934 toward photodiodes 804 and 806. However, opaque cover layer portions 904 and 906 and optical barrier 908 cooperate to provide at least partial optical isolation between photodiodes 804 and 806, creating spatially dependent reflectance patterns with respect to reflected light 920, 922, 924, 930 and 932 from objects 910, 912 and 914.

In general, the distance traveled by the reflected light determines its intensity such that longer distances result in lower intensities. Further, by partially obstructing the reflected light from objects 910, 912, and 914, opaque cover layer 904,906 and optical barrier 908 enhance the proximity detection capability of sensor IC 128. A further example is described below that includes an additional aperture in the opaque layer to focus light from an LED to limit its view angle.

FIG. 10 is a cross-sectional view of a portion of a third embodiment of a system 1000 including multiple photo detectors having multiple view angles including limited view angles through apertures in an opaque cover layer. System 1000 includes the system 900 of FIG. 9 with a light source circuit 1002 having a light-emitting diode 1004 and an opaque cover portion 1006 that cooperates with opaque cover portion 904 to provide an aperture 1007. Aperture 1007 limits a view angle of LED 1004 to direct light 1010 within a narrow view angle toward object 1008. Object 1008 reflects the light from LED 1004 toward sensor IC 128 as indicated by reflected light 1012 and 1014. The reflected light may be partially obstructed by opaque cover layer portions 1006, 904, and 906 and by optical barrier 908 to enhance the spatial dependence of photodiodes 804 and 806. This configuration provides one possible technique for discriminating the directionality of the reflected light 920, 922, 924, 930, 932, and 934.

It should be appreciated that, as described above, positioning the sensor IC 128 and associated optical elements within an optical window having multiple view angles permits proximity and/or motion detection within an expanded area and with enhanced directionality detection. Positioning the aperture at or near an sidewall can provide multi-directional detection through the aperture, which can be formed in the top or side cover to provide the optical window. In an example, the aperture can be a hole in the opaque cover layer or can be provided by an optical barrier above the cover. Active proximity sensing with directionality can be realized by adding an LED light source, which illuminates the target area above (an optionally along side of) photodiodes 804 and 806. An example of such an implementation of a device having an opaque cover layer and including a sensor IC near a sidewall or side of the device to allow horizontal and vertical view angles.

FIG. 11 is a top view of an embodiment of an apparatus 1100 including an opaque cover layer 1102 having an aperture 1104 above a sensor integrated circuit 128 including multiple photodiodes 1106 separated by optical barriers 1108. At least some of photodiodes 1106 may be proximate to a transparent portion of the cover layer along a side or sidewall of apparatus 1100, allowing for a first view angle through aperture 1104 and a second view angle through a second aperture (not shown) in the opaque cover layer extending over a portion of the sidewall/side.

FIG. 12 is a cross-sectional view 1200 of the apparatus 1100 of FIG. 11 taken along line 12-12 in FIG. 11. Apparatus 1100 includes cover layer 1102 with aperture 1104 over a portion of sensor IC 128 including photodiodes 1106. Optical barrier 1108 is positioned between photodiodes 1106 above a surface of sensor IC 128 to provide at least partial optical isolation between photodiodes 1106. As shown, opaque cover layer 1102 and optical barrier 1108 cooperate to provide partially overlapping view angles.

In an embodiment, a module implementation can be implemented as a multi-directional proximity sensor with two or more apertures. In a particular example, one of the apertures includes an LED to illuminate an area adjacent to the module. At least one of the other apertures includes a sensor IC 128 with multiple photo detectors, where each of the photo detectors has a unique field of view, providing spatial and directional dependence.

It should be understood that the size and location of the apertures define the view angle. Larger apertures increase the view angle and provide increased overlap between optical elements. In contrast, smaller apertures focus the view angle. The above examples depict view angles limited by the size and location of apertures, however it is also possible to limit the view angles through partial obstruction using an opaque layer that extends less than a full width and length of the sensor IC 128. An example is described below with respect to FIG. 13.

Figure 13:
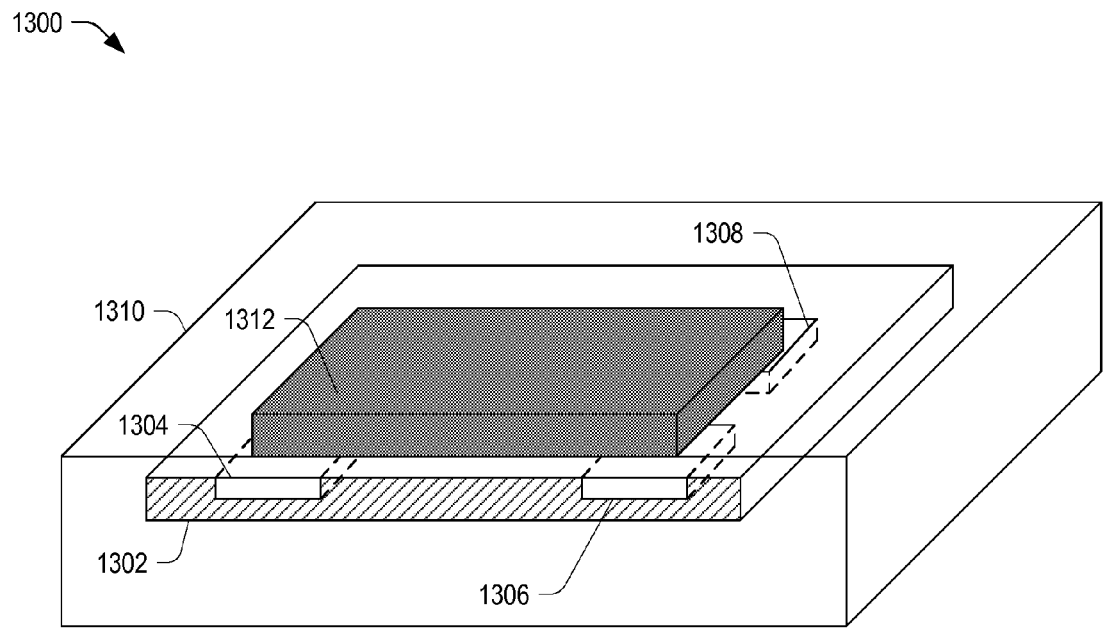
FIG. 13 is a perspective view of a portion of an embodiment of an apparatus including a sensor integrated circuit having multiple photo detectors and an opaque cover layer extending over a portion of a top surface to partially optically obstruct the multiple photo detectors.

FIG. 13 is a perspective view of a portion of an embodiment of an apparatus 1300 including a sensor integrated circuit 1304 (such as sensor IC 128) having multiple photo detectors 1304, 1306, and 1308 and an opaque cover layer 1312 extending over a portion of a top surface 1310 to partially optically obstruct the multiple photo detectors 1304, 1306, and 1308. As discussed above, the single axis light detection above the opaque cover layer can thus be extended to a larger view angle extending toward the sides of the apparatus 1300. In some instances, a molded lens may be added to focus light toward photo detectors 1304, 1306, and 1308 along the sidewalls of opaque cover layer 1312. In an alternative embodiment, the package sidewalls may be non-planar to improve peripheral light coupling. In yet another alternative embodiment, photo detectors 1304, 1306, and 1308 may be tilted at an angle relative to the planar surface of the substrate to enhance peripheral light coupling.

The sensor IC may be positioned at any location along a top, side, or bottom surface and/or at corner positions while still providing enhanced view angles according to embodiments described above. An example of a corner implementation is described below with respect to FIG. 14.

Figure 14:
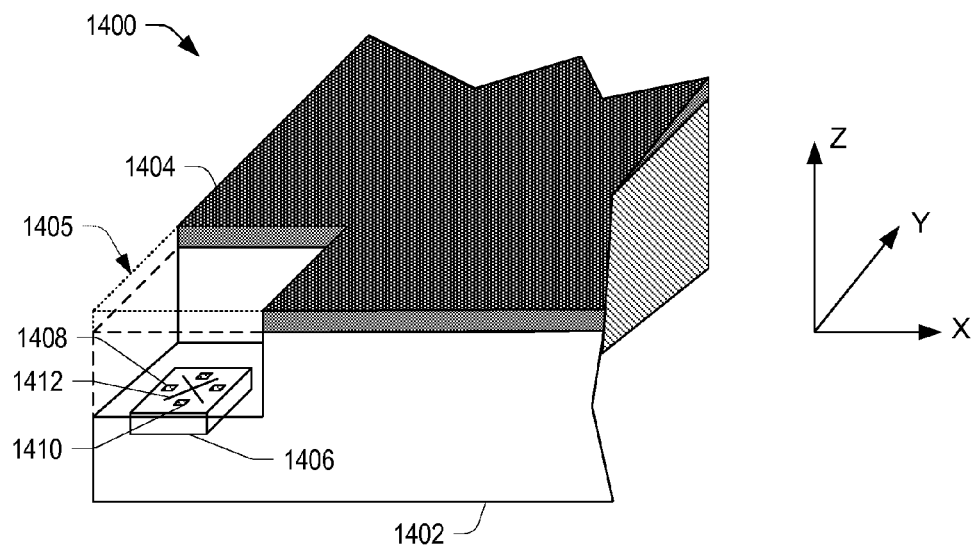
FIG. 14 is a perspective view of a portion of an embodiment of an apparatus including a sensor integrated circuit with multiple photo detectors positioned within an optical window at a corner of the apparatus.

FIG. 14 is a perspective view of a portion of an embodiment of an apparatus 1400 including a sensor integrated circuit 1406 (such as sensor IC 128) with multiple photo detectors 1408 and 1410 (for example) positioned within an optical window 1405 at a corner of the apparatus 1400. Photo detectors 1408 and 1410 are at least partially optically isolated by optical barrier 1412. Apparatus includes a substrate 1402 coupled to sensor IC 1406 and an opaque layer 1404 defining optical window 1405. The position of sensor IC 1406 provides multiple view angles extending in a Z-direction above opaque layer 1404 and extending in an X-direction and a Y-direction to the sides of apparatus 1400.

Figure 15:
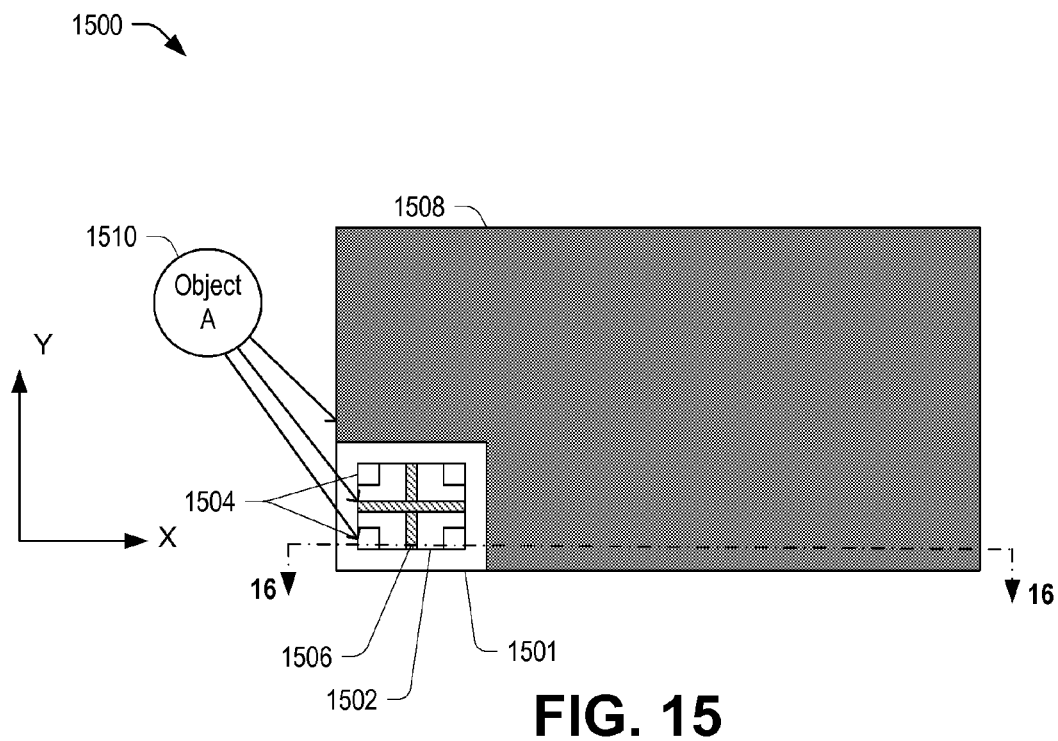
FIG. 15 is a top view of the apparatus of FIG. 14 illustrating one example of a object reflecting light onto the sensor integrated circuit.

FIG. 15 is a top view of an apparatus 1500, similar to the apparatus 1400 of FIG. 14, illustrating one example of a object reflecting light onto a sensor integrated circuit 1502. Sensor integrated circuit 1502 is coupled to a substrate 1501 and positioned at a corner of apparatus 1500 within an optical window through opaque cover layer 1508. Optical barrier 1506 provides at least partial spatial dependence with respect to photo detectors 1504. Object 1510 to the side of apparatus 1500 reflects light toward sensor IC 1502. Opaque cover layer 1508, optical barrier 1506, and side walls of a housing of the device (not shown) obstruct at least a portion of the reflected light, allowing the sensor IC 1502 to be used for proximity and directionality detection.

Figure 16:
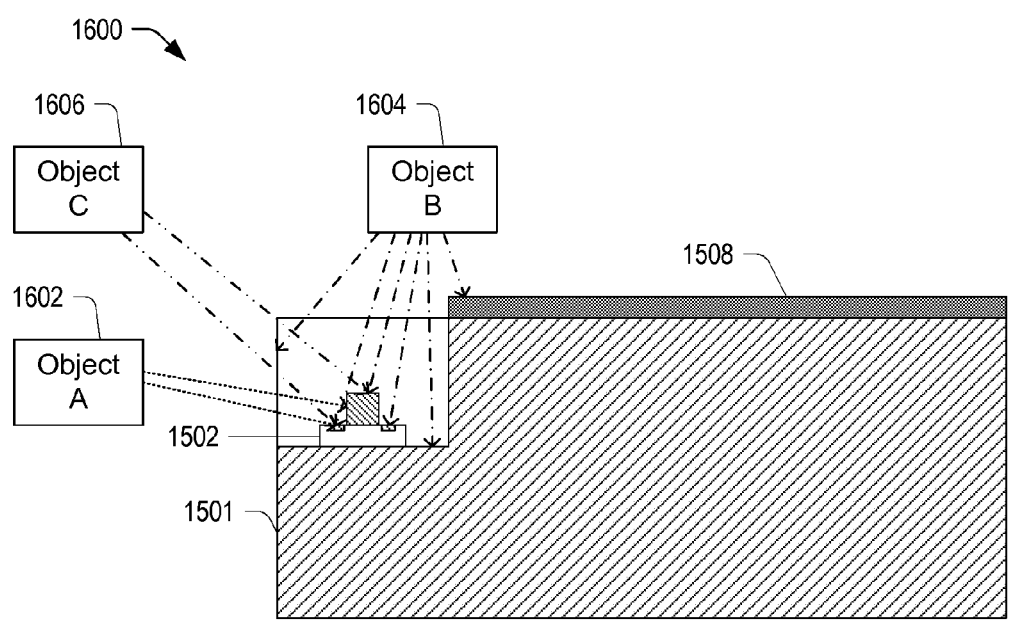
FIG. 16 is a cross-sectional view of the apparatus of FIG. 14 taken along line 16-16 in FIG. 14.

FIG. 16 is a cross-sectional view 1600 of the apparatus of FIG. 14 taken along line 16-16 in FIG. 14. As shown, object 1602 can be detected to the side of apparatus 1500 by sensor IC 1502. Object 1604 can be detected from above opaque cover layer 1508 using sensor IC 1502, and object 1606 can be detected at an angle both above and to the side of apparatus 1500. Optical barrier 1506 blocks some of the reflected light, enhancing the proximity and directionality detection capabilities of sensor IC 1502. The Opaque cover layer 1508, associated apertures, opaque portions of the housing, and optical barriers (such as optical barrier 1506) cooperate to provide enhanced directionality by narrowing the view angles and by partially obstructing at least some of the reflected light.

In conjunction with the apparatuses, circuits, and methods described above with respect to FIGS. 1-16, a technique is disclosed whereby one or more optical elements, such as an LED or one or more photo detectors can be placed on the side/corner location of an electronic device (such as a cell phone) and an aperture can be provided in an opaque cover adjacent to the LED or the photo detector(s) to form an optical window that provides a view angle of greater than ninety degrees covering more than one side and/or a side and a portion of a top surface. Photo detectors can be used to sense proximity and/or motion of an object along the side and/or adjacent to a sidewall of a top surface, which motion can be interpreted as user input (gestures) without blocking or shadowing the display. Narrow apertures and optical barriers can cooperate to enhance the directionality and to narrow the view angles of the photo sensors, improving the sensitivity of the photo sensors. The arrangements described above make it possible to move gesture control inputs from above the screen to the side periphery of the device. Further, the above-example are provided for illustrative purposes only, and other arrangements and configurations, including different optical barrier patterns, different aperture shapes and sizes, and different numbers of photo detectors can be used without departing from the scope of the present disclosure.

Although the present invention has been described with reference to preferred embodiments, workers skilled in the art will recognize that changes may be made in form and detail without departing from the scope of the invention.

What is claimed is:

1. An apparatus comprising:
    a housing having a front surface, a rear surface, and at least one sidewall therebetween;
    a plurality of optical windows formed in the housing, each of the plurality of optical windows allowing light to pass through from multiple directions, at least some of the plurality of optical windows configured to provide a view angle of at least ninety-degrees;
    a plurality of photo detectors to generate electrical signals based on received light, each of the plurality of photo detectors disposed within a respective one of the plurality of optical windows;
    a plurality of light-emitting diodes;
    a second plurality of optical windows, each of the second plurality of optical windows corresponding to at least one of the plurality of light-emitting diodes; and
    a control circuit coupled to the plurality of photo detectors to receive the electrical signals, determine light variations from the electrical signals, and determine a change in position of an object based on variation ratios of the light variations received by at least one pair of photo detectors within the plurality of photo detectors in response to determining the light variations.

2. The apparatus of claim 1, wherein the control circuit is configured to determine the change in position of the object relative to at least one of the front surface, the rear surface, and the at least one sidewall.

3. The apparatus of claim 1, wherein each of the plurality of optical windows comprises:
    an opening defined in the housing in the at least one sidewall and along an adjacent portion of one of the front surface and the rear surface; and
    a cover extending along a portion of the at least one sidewall and an adjacent portion of at least one of the front surface and the rear surface, the cover configured to seal the opening, the cover including at least one aperture defining a transparent region.

4. The apparatus of claim 1, wherein the at least one sidewall includes a plurality of corner portions, each of the plurality of corner portions includes one of the second plurality of optical windows.

5. The apparatus of claim 1, where the at least one sidewall includes a plurality of corner portions, each of the plurality of corner portions includes one of the first plurality of optical windows.

6. The apparatus of claim 1, wherein each of the plurality of optical windows allows light to pass through at multiple angles, the multiple angles providing an optical range of greater than ninety degrees.

7. The apparatus of claim 1, wherein at least one of the plurality of optical windows includes an optical reflector configured to direct light in a particular direction.

8. The apparatus of claim 1, wherein the control circuit is configured to communicate the change in position of the object to a host processor to determine a user input in response to the change in position.

9. A circuit comprising:
    a substrate including at least one sidewall;
    a plurality of photodiodes configured to generate electrical signals based on received light including light variations caused by an object moving relative to the substrate, at least some of the plurality of photodiodes positioned along the at least one sidewall of the substrate and configured to receive light from at least two directions;
    a plurality of optical barriers, at least one of the plurality of optical barriers disposed between adjacent ones of the plurality of photodiodes, at least some of the plurality of optical barriers configured to allow a view angle of at least ninety degrees to at least one of the plurality of photodiodes; and a control circuit coupled to the plurality of photodiodes, the control circuit to receive the electrical signals, determine the light variations from the electrical signals, and determine a change in position of the object based on variation ratios of the light variations received by at least one pair of photodiodes of the plurality of photodiodes in response to determining the light variations; and a plurality of outputs coupled to the control circuit and configured to couple to a plurality of light-emitting diodes; and wherein the plurality of optical barriers include at least one optical barrier disposed between the plurality of light-emitting diodes and the at least some of the plurality of photodiodes.

10. The circuit of claim 9, further comprising a reflector adjacent to at least one photodiode from the plurality of photodiodes to expand a view angle of the at least one photodiode from the plurality of photodiodes to receive light from multiple angles.

11. The circuit of claim 9, further comprising a reflector adjacent to at least one light-emitting diode from the plurality of light-emitting diodes to expand a view angle of the at least one light-emitting diode to direct light at multiple angles.

12. The circuit of claim 9, wherein at least one of the plurality of photodiodes is positioned on the substrate at a tilt angle that is greater than zero degrees and less than ninety degrees relative to a planar surface of the substrate.

13. An apparatus comprising:

a housing including a front wall, a rear wall and at least one sidewall extending therebetween;

a plurality of optical elements;

a plurality of optical windows formed along the at least one sidewall, each optical window providing a view angle allowing light to pass through from at least two directions relative to the housing, each of the plurality of optical windows including at least one of the plurality of optical elements, at least one of the plurality of optical windows configured to provide a view angle of at least ninety-degrees; and a control circuit within the housing and coupled to the plurality of optical elements, the control circuit configured to determine light variations using at least some of the plurality of optical elements and determine a change in position of an object based on variation ratios of the light variations received by at least one pair of optical elements of the plurality of optical elements in response to determining the light variations, the control circuit to detect a user input in response to determining the change in position of the object.

14. The apparatus of claim 13, wherein the change in position of the object is determined relative to at least one of the front wall, the rear wall, and the at least one sidewall.

15. The apparatus of claim 13, wherein the plurality of optical elements comprises at least one light-emitting diode and at least one photo sensor.

16. The apparatus of claim 13, wherein the view angle comprises multiple directions from which light can be received that provides an angle of greater than ninety degrees.

17. The apparatus of claim 13, further comprising a reflective element disposed within at least one of the plurality of optical windows to expand the view angle to direct light in multiple directions.

18. The apparatus of claim 13, further comprising a plurality of optical barriers adjacent to the control circuit and configured to partially obstruct light from reaching at least some of the plurality of optical elements to provide spatial dependence between the plurality of optical elements.

* * * * *